W. HUMISTON.
Candle Mold.
No. 1,132. Reissued Jan. 22, 1861.
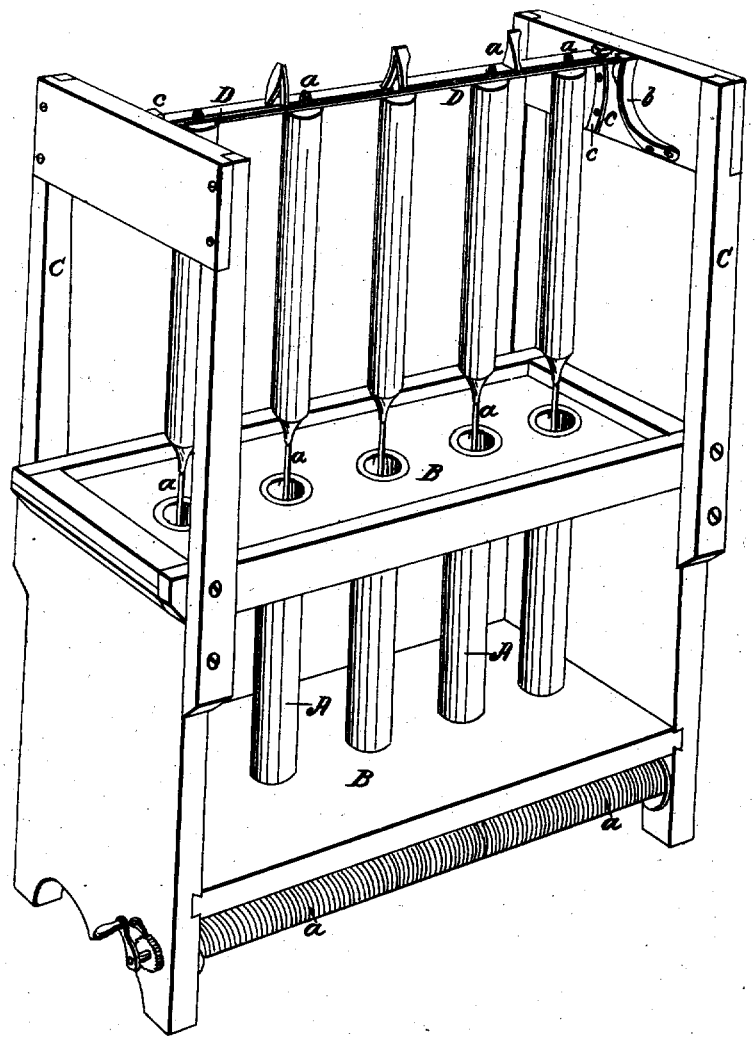
N. PETERS, Photo-Lithographer, Washington, D. C.

UNITED STATES PATENT OFFICE.

WILLIS HUMISTON, OF TROY, NEW YORK.

IMPROVEMENT IN APPARATUS FOR MOULDING CANDLES.

Specification forming part of Letters Patent No. 8,607, dated December 23, 1851; Reissue No. 1,132, dated January 22, 1861.

*To all whom it may concern:*

Be it known that I, WILLIS HUMISTON, of the city of Troy, county of Rensselaer and State of New York, have invented new and useful Improvements in Candle-Molds, &c., for which Letters Patent were granted me on the 23d day of December, 1851, bearing title of Improvement in Candle-Making Apparatus, which Letters Patent, by reason of a defective specification, are now inoperative; therefore I do hereby declare that the following is a full and exact description of my said invention, reference being had to the accompanying drawings, making a part of the specification.

Like letters refer to like parts.

The drawing contains but one figure, in which a perspective view of the molds, candles cast or molded therein, candle-wicks, and the apparatus for drawing the candles from the molds and suspending the same over the said molds are fully shown.

The nature of my invention consists in the manner of wicking the molds by suspending the candles or wicks above the same when drawn therefrom by the means hereinafter described.

It also consists in drawing the candle-wick from a reel or spool and suspending the same in the center of the molds for the next succeeding candle to be molded therein and thereon.

It also consists in gripping the candle-wick by the arrangement of means hereinafter described, so as to draw the candles from the molds and hold them directly over the molds from which each candle is taken until the said molds are again filled with material for candles.

To enable others skilled in the art to which my invention relates, I will now proceed to describe the construction and operation of the same, which is as follows, to wit:

I construct the mold A in the usual manner for the construction of such molds. They are securely fastened to the frame B and B. The upper ends of said molds pass up and entirely through the upper frame, B, and then open into a reservoir to receive the tallow or material while being poured into said molds. The wicks *a* are then passed through the said molds from the reel or spool below. Then the upper ends of said wicks are received or gripped by the grippers or pinchers D, which are raised up, supported, and then firmly held closed upon said wicks *a* by means of the springs *b* pressing them into notches or grooves in the guide-pieces *c*.

*e e* are frames or standards so constructed and arranged as to contain and guide the said pinchers or grippers D, whereby the candles therein firmly held by the wick thereof will correctly center the wick in the molds below ready for the purpose of the forming or molding of candles therein, while the candles first before drawn are still suspended above the said molds by means of the said pinchers or grippers D and the said frame containing the same. The candles are first drawn from the molds wherein they were molded by the said pinchers or grippers D and suspended by the wick thereof therein firmly held directly over the center of the said molds from which they were before taken, at the same time wicking the molds below for the next succeeding candles, which, when molded and ready to be drawn therefrom, those suspended above and in connection therewith are severed or cut therefrom in any convenient manner. In this mode of drawing candles from their respective molds, suspending, and wicking for the next succeeding set of candles I am able to economize room.

The pinchers or grippers I construct in two parts, extending and opening lengthwise with the tier of molds below. Each part is connected by means of a hinge or its equivalent. These parts may be made of steel or iron and of sufficient size to answer the required purpose. When they are brought together upon the said several wicks, each are therein firmly held so that the candles may be drawn from the molds wherein they were cast, and when thus drawn therefrom are held in direct line with and over the center of said molds by means of securing the said pinchers or grippers within and to the said frame *e*, as hereinbefore described.

The construction and operation being greatly simplified, the wick may be stretched and firmly held independent of the candle, and without liability of breaking the tip of the same, and being certain at all times of centering the wick precisely in the molds, with or without the candles being molded thereon. The candles being separated from those in the molds below by cutting the wick connecting them, as aforesaid, and the same removed before drawing the next series of candles molded in the molds below, as aforesaid, leaves the reservoir at the top of said molds free to be cleaned from tallow, &c., by scraping away the same even with the top of the molds whenever found necessary so to do.

Having thus described my invention, what I claim, and desire to secure by Letters Patent, is—

1. The wicking the candle-molds A by means of the grippus or pinchers D, in connection with the reel or spool containing the wick below, as herein described and set forth.

2. The suspending of the candles in and upon a center line with the molds A directly below by means of the grippers or pinchers D in connection with the tip of the said mold, as and for the purpose herein described and set forth.

3. The gripping of the candle-wick by means of the said grippers or pinchers D, or their equivalents, and by the same drawing the candles from their respective molds and suspending the same above the molds until the next series of candles are molded, and those suspended are cut from the wick and removed in the manner and for the purpose herein described and set forth.

In testimony whereof I have on this 25th day of December, 1860, hereunto set my hand.

WILLIS HUMISTON.

Witnesses:

MARCUS P. NORTON,
DANIEL HALL.